United States Patent [19]
Goby

[11] Patent Number: 6,059,513
[45] Date of Patent: May 9, 2000

[54] PULL-TYPE REAR EJECTOR WAGON

[75] Inventor: Larry G. Goby, McAllen, Tex.

[73] Assignee: Inter-American Vanguard Corporation, Miami, Fla.

[21] Appl. No.: 09/106,204

[22] Filed: Jun. 29, 1998

[51] Int. Cl.⁷ .................................................. B60P 1/18
[52] U.S. Cl. .................... 414/517; 414/525.6; 414/525.1
[58] Field of Search ................................ 414/509–519, 414/525.1, 525.6

[56] References Cited

U.S. PATENT DOCUMENTS

| | | | |
|---|---|---|---|
| 2,463,643 | 3/1949 | Recker | 414/515 |
| 3,247,984 | 4/1966 | Gregory, Sr. et al. | 414/513 |
| 3,524,559 | 8/1970 | Osborne | 414/517 |
| 3,896,947 | 7/1975 | Pearce | 414/513 X |
| 3,941,260 | 3/1976 | Fisher et al. | 414/517 |
| 4,049,137 | 9/1977 | Meyer | 414/517 X |
| 4,059,307 | 11/1977 | Neufeldt | 414/414 X |
| 4,067,466 | 1/1978 | Parks et al. | 414/509 |
| 4,090,627 | 5/1978 | Teti | 414/517 X |
| 4,394,976 | 7/1983 | Rae | 414/513 X |
| 4,516,904 | 5/1985 | Simmons | 414/517 |
| 4,544,320 | 10/1985 | Haines | 414/517 X |
| 4,632,628 | 12/1986 | Kress et al. | 414/517 X |
| 4,685,856 | 8/1987 | Hesse, Jr. | 414/515 |
| 5,281,074 | 1/1994 | Mashuda | 414/517 |

*Primary Examiner*—Gregory A. Morse
*Attorney, Agent, or Firm*—Jacobson, Price, Holman & Stern, PLLC

[57] ABSTRACT

A rear ejector wagon having a removable connection to an agricultural or industrial tractor. The wagon is connected to the tractor by a low lying, stable towing tongue. The removability of the ejector wagon from a tractor provides flexibility in use of power units. Once the ejector wagon is removed from the tractor, the tractor can be used for other purposes. With the use of a low lying towing tongue, a two stage hydraulic cylinder can be used to eject the load. The cylinder is contained within a protective housing to shield the exposure of the cylinder to debris and other material loaded into the wagon. Typically, the hydraulic cylinder will have a length of 80 to 150 inches. A preferred length is 100 inches.

9 Claims, 6 Drawing Sheets

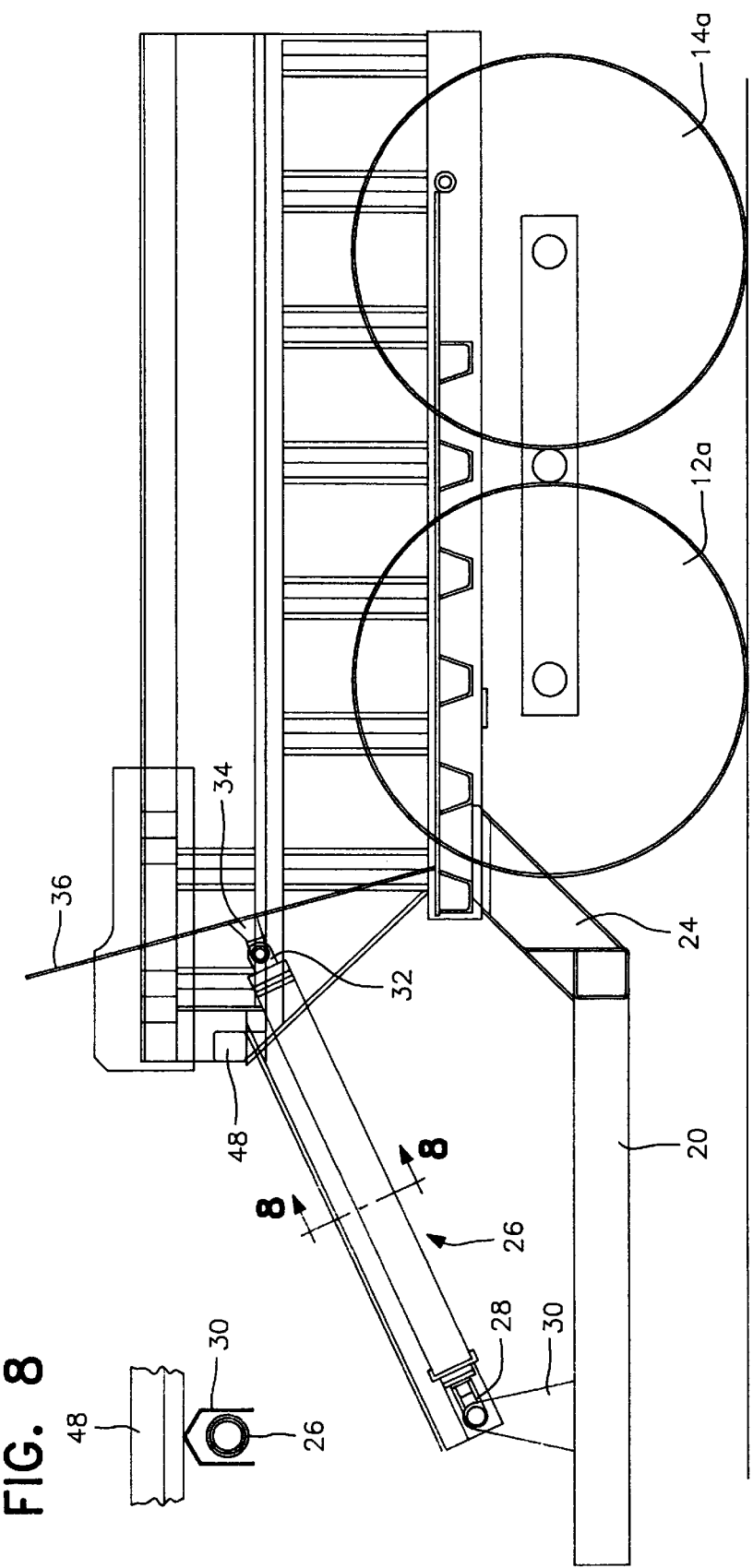

PULL-TYPE REAR EJECTOR WAGON

FIELD OF THE INVENTION

The present invention relates to a pull-type rear ejector wagon for mounting on an agricultural or industrial, rubber or track-type machine by a towing tongue.

BACKGROUND OF THE INVENTION

Earth moving wagons are known for use in excavation and mining operations. These wagons have traditionally been connected to a dedicated tractor by a gooseneck extension hitch affixed to the wagon and pivotally mounted on the dedicated tractor. Other uses of the tractor were not possible.

The advantage of the use of a gooseneck extension hitch is that a 90 degree steering angle is allowed for increased maneuverability. This maneuverability is desired when used underground, where space is limited. The gooseneck extension hitch provides a required clearance above the two rear wheels of the tractor to accommodate tight angle turns of the tractor.

Traditionally, the wagon associated with a gooseneck extension connection includes only two wheels for carrying the load. Some of these wagons are tipped up to release a load while other wagons have an ejection system to force a load rearwardly from the wagon.

As a wagon is raised or tipped to dump a load, the instability of the wagon greatly increases. This is due to having the load in an elevated position. Combining the elevated load with uneven working surfaces can result in overturning of the vehicle. If the tractor is turned 90°, this situation is further aggravated.

In the ejection system, a piston cylinder arrangement is subject to damage during loading of the wagon. In addition, the available space for cylinder mounting and required ejector travel requirements necessitate greater than two stage hydraulic telescopic cylinders. The force required to retract the ejector with these cylinders necessitates the use of multiple or oversized cylinders.

SUMMARY OF THE INVENTION

It is therefore an object of the present invention to provide a rear ejector wagon having a removable connection to an agricultural or industrial tractor. The wagon is connected to the tractor by a low lying, stable towing tongue. The removability of the ejector wagon from a tractor provides flexibility in use of power units. Once the ejector wagon is removed from the tractor, the tractor can be used for other purposes.

With the use of a low lying towing tongue, a two stage hydraulic cylinder can be used to eject the load. The cylinder is contained within a protective housing to shield the exposure of the cylinder to debris and other material loaded into the wagon. Typically, the hydraulic cylinder will have a collapsed length of 80 to 150 inches. A preferred length is 100 inches.

One end of the hydraulic cylinder is anchored by a ball mount on an extension projecting above the towing tongue. The opposite end of the hydraulic cylinder is pivotally fixed to the ejector wall. The cylinder is mounted with its rod position forward. Therefore, when the hydraulic cylinder is extended to advance the rear ejector wall, only the largest tube of the hydraulic cylinder is exposed to debris that may fall rearwardly over the rear ejector wall and into the area of the tractor in which the hydraulic cylinder is exposed. This minimizes damage to the hydraulic cylinder.

The ejector wagon includes two wheels on both sides of the wagon. The towing tongue is connected to the wagon by a downwardly angled extension so that the longitudinal axis of the towing tongue extends below an axis interconnecting the horizontal axis of the two sets of wheels. Due to the low profile of the towing tongue, high stability of the ejector wagon is assured.

Accordingly, it is another object of the present invention to provide a pull-type rear ejector wagon removably connected to an agricultural or industrial tractor by a towing tongue having a longitudinal axis located below an axis of the wheels of the tractor.

It is yet another object of the present invention to provide a rear ejector wagon removably mounted to an agricultural or industrial tractor by a towing tongue, with one end of a hydraulic cylinder pivotally anchored on the towing tongue and an opposite end of the hydraulic cylinder pivotally fixed on an ejector plate of the wagon in a protective manner to minimize exposure to debris and material in the wagon.

It is still yet another object of the present invention to provide a pull-type rear ejector wagon having a towing tongue with a longitudinal axis located below a plane extending through the central axis of the two wheels located on both sides of the wagon and the wagon having a two stage hydraulic cylinder extending from the towing tongue to an ejector plate, with the hydraulic cylinder being protected during its extension and retraction.

These and other objects of the invention, as well as many of the intended advantages thereof, will become more readily apparent when reference is made to the following description taken in conjunction with the accompanying drawings.

BRIEF DESCRIPTION OF THE DRAWINGS

FIG. 7 is a side elevational view of the ejector wagon with the two stage hydraulic cylinder in a retracted position and extending between the towing tongue and the ejector plate.

FIG. 8 is a sectional view taken along line 8—8 of FIG. 7 to demonstrate the protective guard surrounding the hydraulic cylinder.

DETAILED DESCRIPTION OF THE PREFERRED EMBODIMENTS

Figure 1:
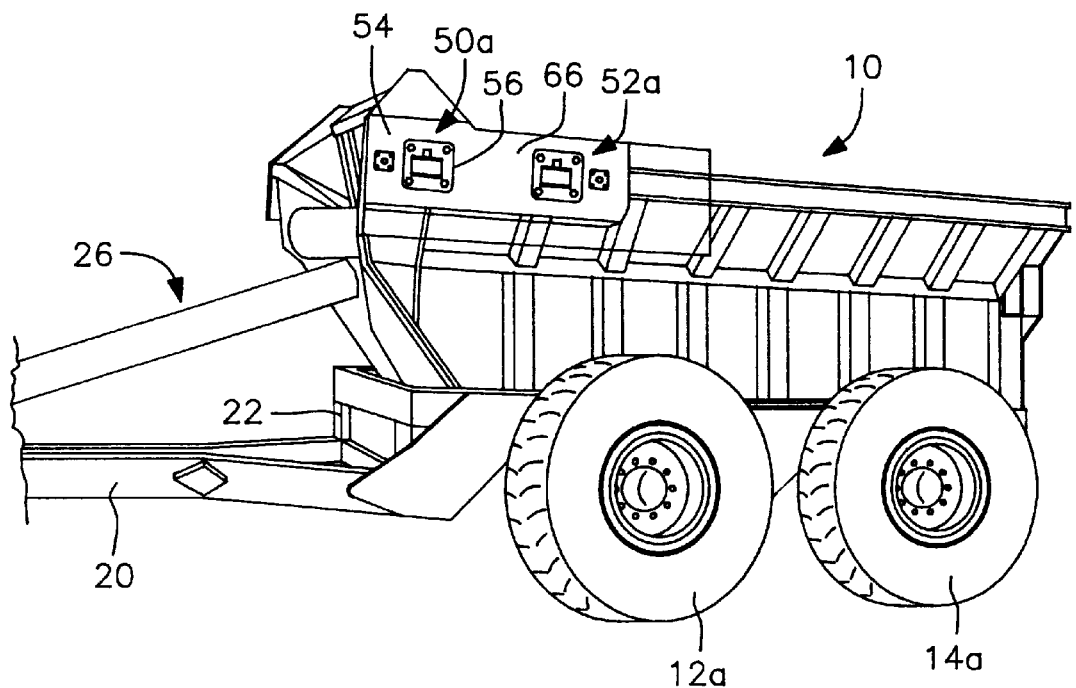
FIG. 1 is a perspective view of the pull-type rear ejector wagon of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
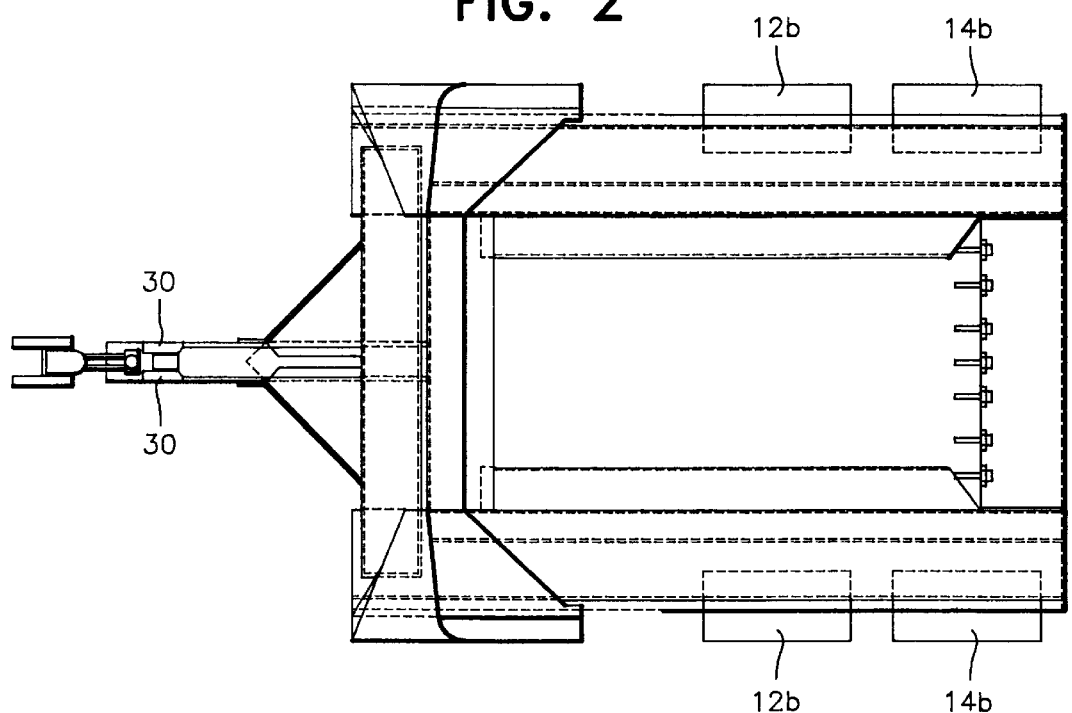
FIG. 2 is a plan view of the rear ejector wagon.
Figure 3:
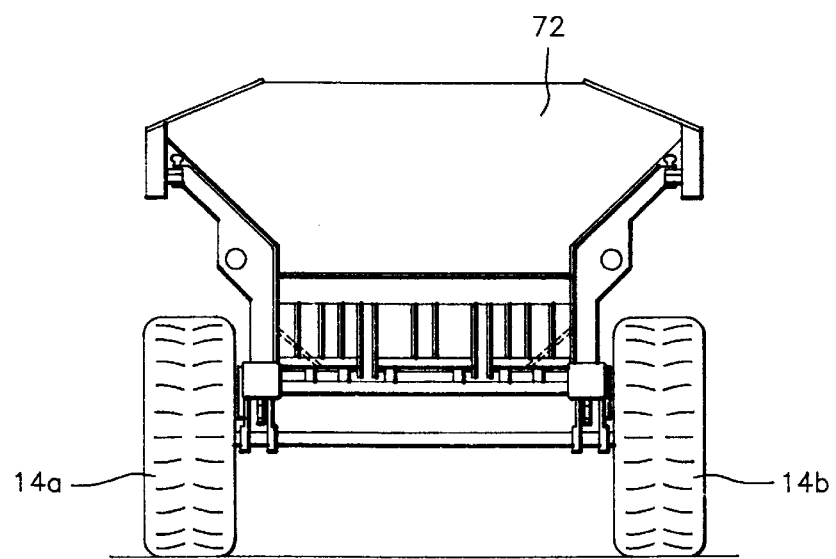
FIG. 3 is a rear view of the rear ejector wagon illustrating the pivotal tailgate.

With reference to the drawings, in general, and to FIGS. 1 through 4, in particular, a rear ejector wagon embodying the teachings of the subject invention is generally designated as 10. With reference to its orientation in FIG. 1, the wagon includes two load supporting wheels 12a, 14a. Similarly, on the opposite side of the wagon 10, as shown in FIG. 2, are located two load supporting wheels 12b, 14b.

Due to the spacing between the wheels on each side of the wagon and the positioning of the wheels on the wagon, the entire load of the wagon, as well as the wagon itself, is fully supported by the wheels, independent of any other support. In contrast, in a gooseneck extension hitch, the one wheel on each side of the wagon is used in conjunction with the connection of the gooseneck hitch to a piece of machinery to support a load in the wagon. In a gooseneck arrangement, the wheels do not entirely support the load.

Figure 4:
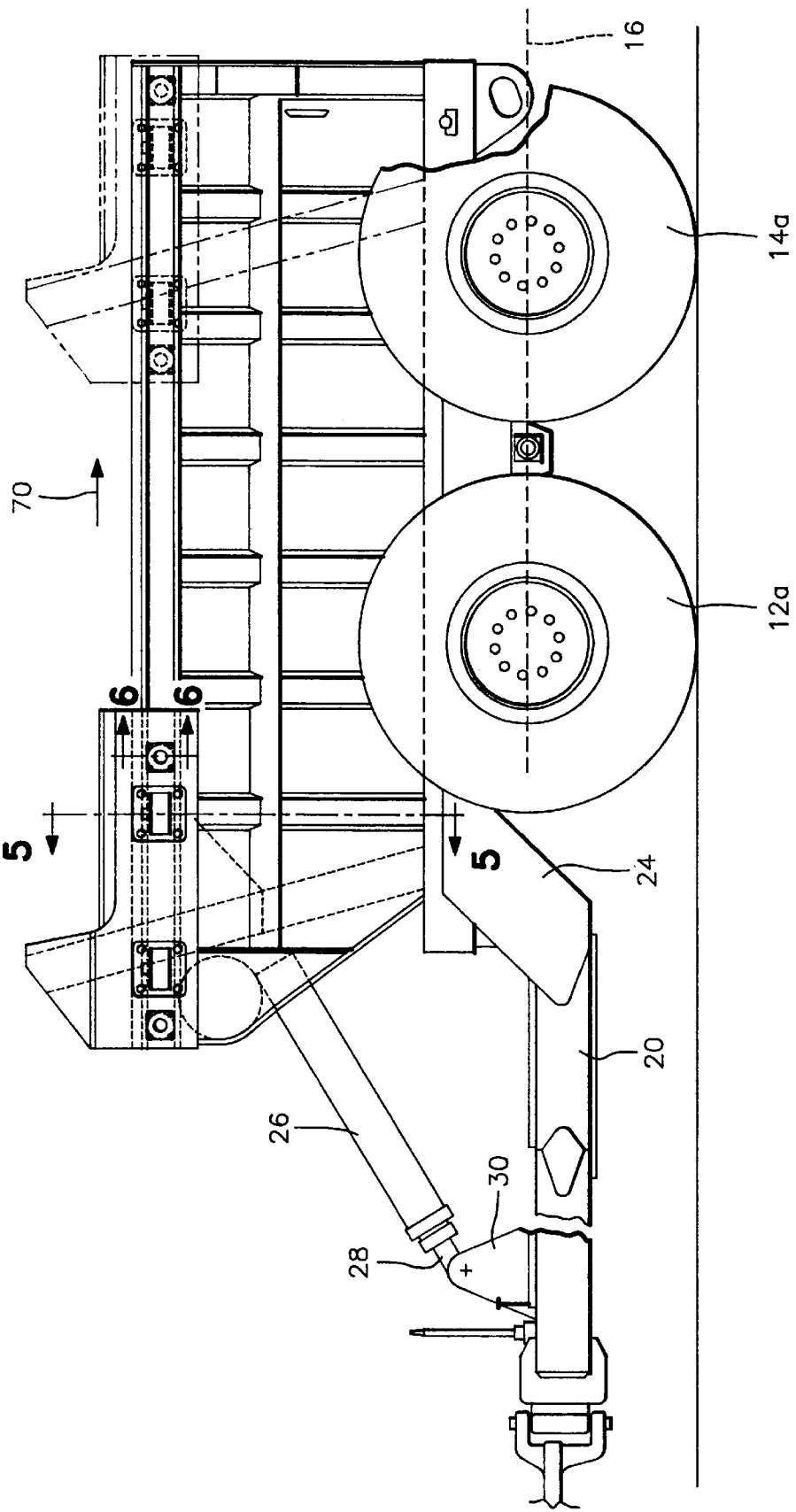
FIG. 4 is a side elevational, partially broken away view of the rear ejector wagon of the present invention, including the towing tongue and the two stage hydraulic cylinder used for moving an ejector plate which is shown in dotted lines in a first position for filling of the wagon and in a second position to which the ejector plate is moved for emptying the contents of the wagon.

As shown in FIG. 4, an imaginary line 16 extending through the center axle of wheels 12a, 14a and which would similarly extend through the center axle of the wheels 12b, 14b, is located above a longitudinal axis of towing tongue 20. The positioning of the axis of the center of the wheels of the tractor 10 above a longitudinal axis of the towing tongue provides increased stability for the wagon. Increased stability is also provided by the inclusion of two wheels on both sides of the tractor 10.

The towing tongue 20 is connected to a bottom portion 22 of the wagon 10 by a downwardly angled plate 24. This provides for the positioning of the towing tongue below a center line of the wheels of the tractor.

Figure 9:
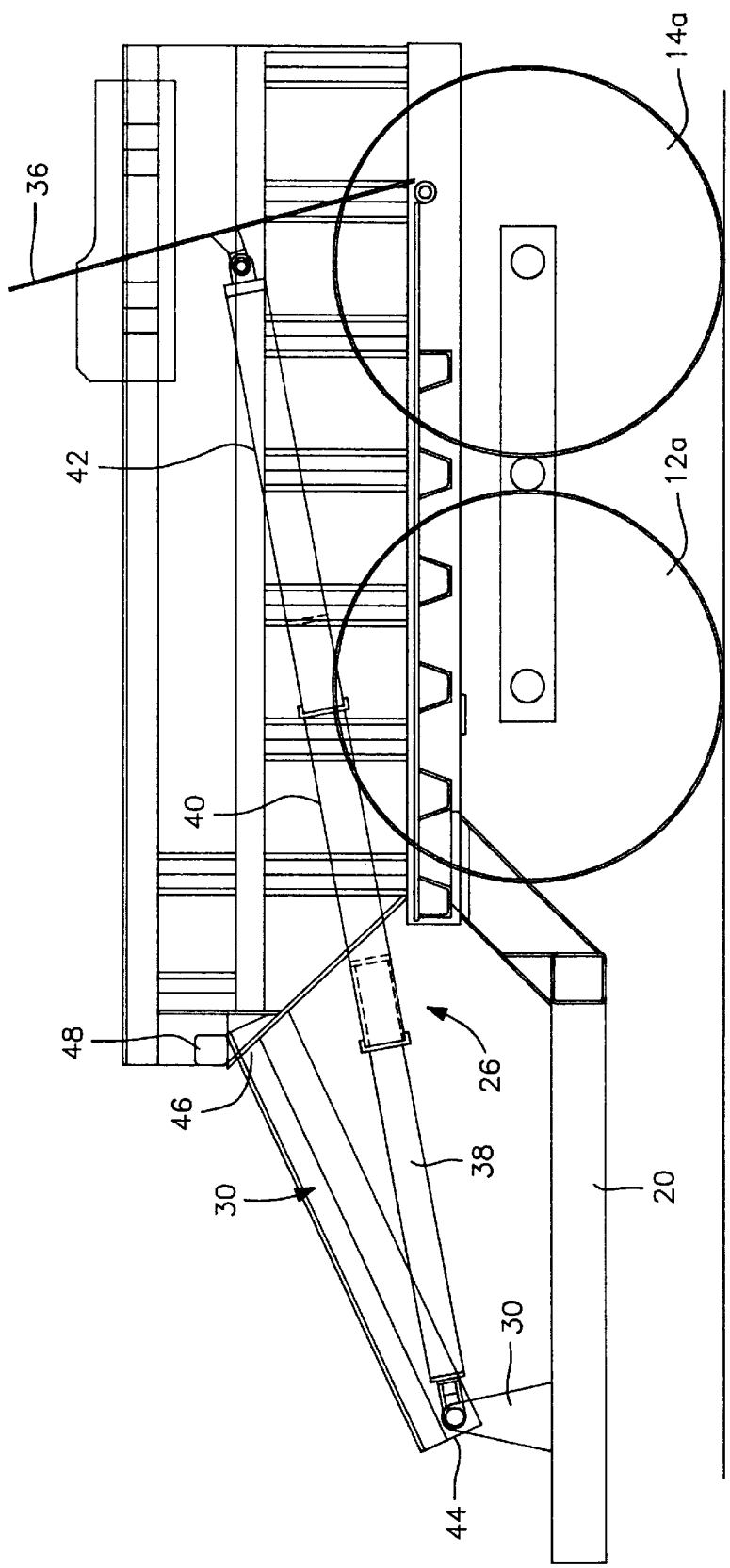
FIG. 9 is a side elevational view of the ejector wagon with the hydraulic cylinder in an extended position for moving of the ejector plate to empty the contents of the wagon.

In addition, as shown in FIG. 4, the low positioning of the towing tongue 20 enables the mounting of a two stage hydraulic cylinder 26 in an advantageous position. One end 28 of the hydraulic cylinder is pivotally anchored between two support plates 30 extending upwardly from the towing tongue 30. The hydraulic cylinder shown in FIGS. 1 and 4 is devoid of U-shaped guard 30 as shown in FIGS. 7 through 9 to protect the hydraulic cylinder as it is extended.

Shown in the retracted position in FIGS. 4 and 7, the opposite end 32 of the hydraulic cylinder 26 is pivotally mounted on a plate 34 connected on one side of an ejector plate 36. The ejector plate 36 is moved from the position shown in FIG. 7 to the position shown in FIG. 9 by the extension of the hydraulic cylinder 26 to expose its three sections 38, 40, 42. The two extension stages are represented by sections 40, 42 which extend from the fixed section 38 of the hydraulic cylinder.

Guard 30 is also mounted at one end 44 on the plate 30. The opposite end 46 is fixed to a cross bar 48 extending across one end of the wagon 10.

During the extension of the hydraulic cylinder 26, the guard 30 is positioned to protect the exposed sections of the hydraulic cylinder. In addition, due to the connection of the hydraulic cylinder at an approximate mid point of the ejector plate 36, the forces of the hydraulic cylinder can be concentrated on the ejector plate for a smooth movement of the ejector plate.

In addition, the extension of the hydraulic cylinder is relatively low within the wagon. In its extended position, as shown in FIG. 9, the hydraulic cylinder is prevented from exposure, above the top edge of the wagon, to accidental contact by earth moving machinery.

To assist in the sliding of the ejector plate 36 towards the rear of the wagon, two sets of two rollers 50a, 52a are positioned on each side of the wagon. In a single set of rollers 50a is included a horizontal axis roller assembly 54 and a vertical axis roller assembly 56.

Figure 5:
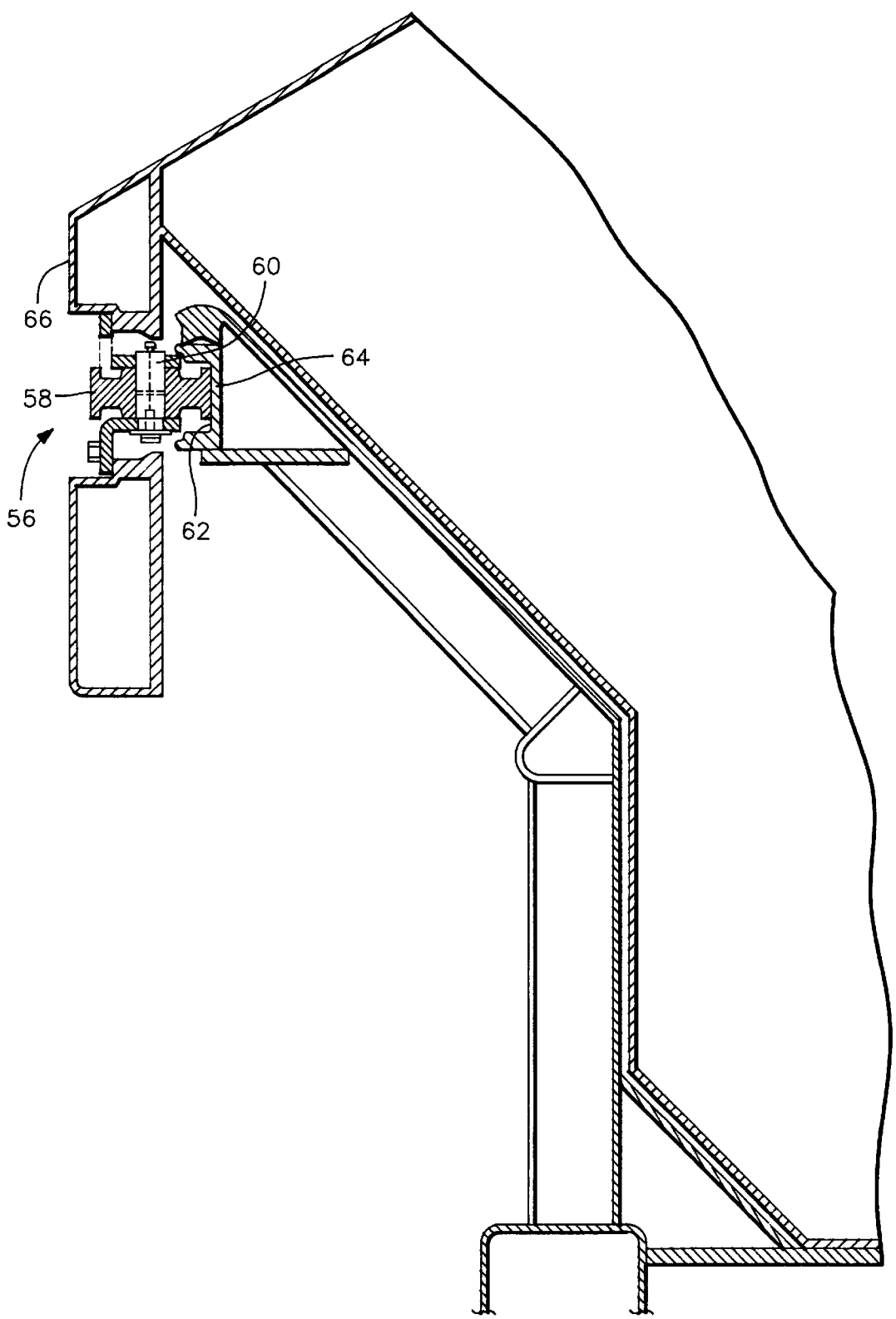
FIG. 5 is a sectional view taken along line 5—5 of FIG. 4.

Vertical axis roller assembly 56 is shown in FIG. 5 as including a roller 58 rotating about a vertically extending shaft 60 such that a peripheral edge of the roller 58 engages an inner surface 62 of a C-shaped track 64. The roller assembly 56 is recessed from exterior surface 66 of the side wall portion of the wagon which moves with the ejector plate as shown in FIG. 4.

Figure 6:
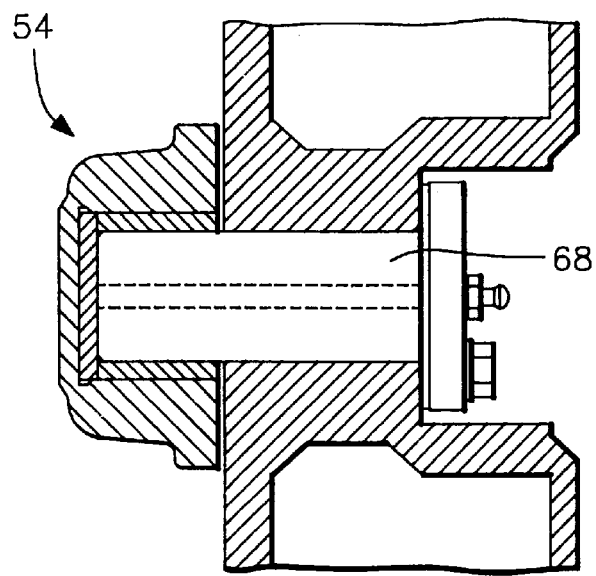
FIG. 6 is a sectional view taken along line 6—6 of FIG. 4.

In FIG. 6, roller assembly 54 is shown including horizontally aligned roller 68. Roller 68 aids in the transmission of the side panel portions of the wagon which move along with the ejector plate upon extension of the hydraulic cylinder.

It is understood that similar roller assemblies 50b and 52b are associated with the opposite side portions of the wagon which are movable with the ejector plate 36. As the ejector plate moves in the direction of arrow 70, a tailgate 72 of the wagon is released for ejection of materials from the rear of the wagon.

By the central location of a single hydraulic cylinder on the ejector plate, an increased force is provided on the ejector plate to provide a smooth operation for release of materials from the rear of the wagon.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A towable transport vehicle comprising:
   a wagon having two sides, a front end and a rear end,
   two wheels positioned on both of said two sides of the wagon for independently supporting the weight of the wagon and its contents,
   a towing tongue extending from the front end of the wagon for connecting the wagon to a self-propelled vehicle,
   a longitudinal axis of said towing tongue extending below a line extending through a center of said two wheels on said two sides of the wagon,
   an ejector plate slidable mounted in said wagon for movement from said front end to said rear end for moving the contents of the wagon out of said rear end of the wagon, said ejector plate being inclined with respect to the vertical, and
   a single hydraulic cylinder pivotally mounted on said towing tongue and pivotally mounted on a center of said ejector plate, said hydraulic cylinder being mounted in an inclined orientation for increasing force applied to said ejector plate so as to provide a smooth discharge of material from the rear end of the wagon and for varying an angle of said hydraulic cylinder as said hydraulic cylinder is advanced and retracted during movement of said ejector plate.

2. A towable transport vehicle as claimed in claim 1, wherein said single hydraulic cylinder is a two stage hydraulic cylinder.

3. A towable transport vehicle as claimed in claim 1, wherein said single hydraulic cylinder has a collapsed length of 80 to 150 inches.

4. A towable transport vehicle as claimed in claim 3, wherein said single hydraulic cylinder has said collapsed length of 100 inches.

5. A towable transport vehicle as claimed in claim 1, wherein a guard extends around said single hydraulic cylinder between said towing tongue and said ejector plate when said ejector plate is located adjacent to said front end of the wagon.

6. A towable transport vehicle as claimed in claim 1, wherein said ejector plate includes two sets of two rollers on each of both sides of the wagon for guiding movement of an upper end of said ejector plate along a length of the wagon.

7. A towable transport vehicle as claimed in claim 6, wherein said two rollers include a vertically aligned roller and a horizontally aligned roller.

8. A towable transport vehicle as claimed in claim 1, wherein of said single hydraulic cylinder is pivotally mounted between two plates extending upwardly from said towing tongue.

9. A towable transport vehicle as claimed in claim 1, further comprising, in combination, a self propelled vehicle with said towing tongue being removably mounted on said self propelled vehicle.

* * * * *